Figure 1:
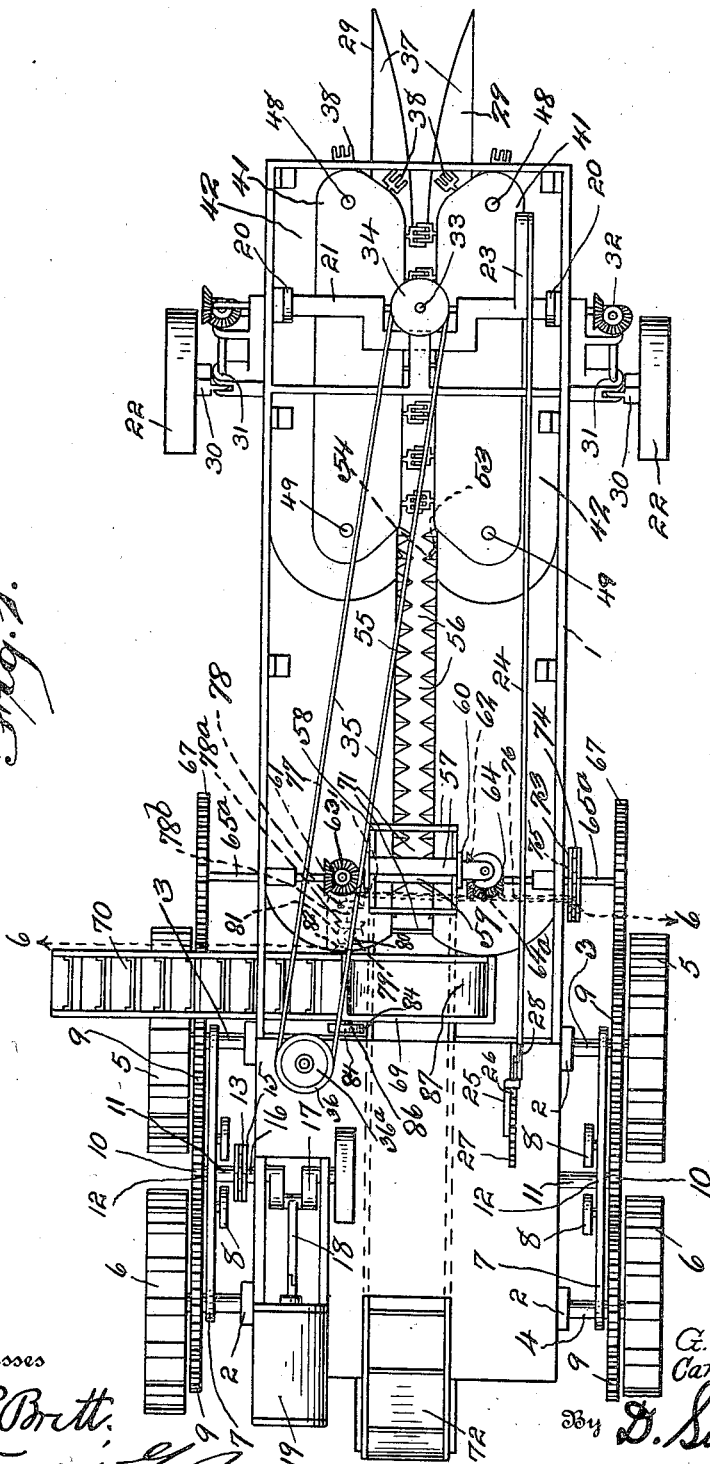

G. M. & C. FEUERSTEIN.
BEET PULLER, TOPPER, AND LOADER.
APPLICATION FILED MAY 1, 1914.

1,124,406.

Patented Jan. 12, 1915.
4 SHEETS—SHEET 1.

Witnesses
J. P. Britt.
Francis J. Boswell.

Inventors
G. M. Feuerstein
Carl Feuerstein
By D. Swift &Co.
Their Attorneys

G. M. & C. FEUERSTEIN.
BEET PULLER, TOPPER, AND LOADER.
APPLICATION FILED MAY 1, 1914.

1,124,406.

Patented Jan. 12, 1915.
4 SHEETS—SHEET 2.

G. M. & C. FEUERSTEIN.
BEET PULLER, TOPPER, AND LOADER.
APPLICATION FILED MAY 1, 1914.

1,124,406.

Patented Jan. 12, 1915.

4 SHEETS—SHEET 3.

Witnesses
T. P. Britt.
Francis G. Boswell.

Inventors
G. M. Feuerstein,
Carl Feuerstein.
By D. Swift & Co.
Their Attorneys

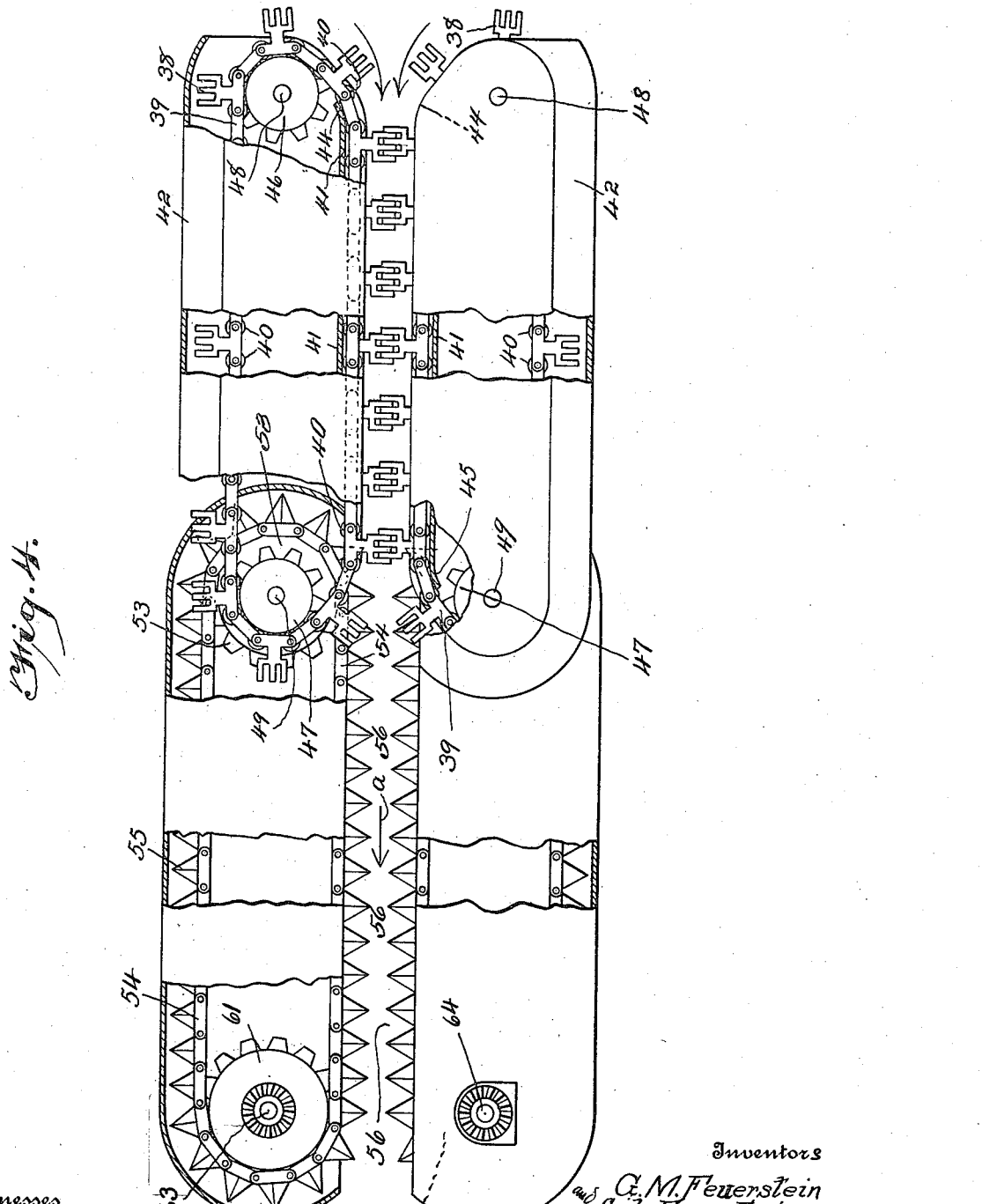

UNITED STATES PATENT OFFICE.

GEORGE M. FEUERSTEIN AND CARL FEUERSTEIN, OF ALGOMA, WISCONSIN; SAID CARL FEUERSTEIN ASSIGNOR TO SAID GEORGE M. FEUERSTEIN.

BEET PULLER, TOPPER, AND LOADER.

1,124,406.    Specification of Letters Patent.    Patented Jan. 12, 1915.

Application filed May 1, 1914. Serial No. 835,699.

*To all whom it may concern:*

Be it known that we, GEORGE M. FEUERSTEIN and CARL FEUERSTEIN, citizens of the United States, residing at Algoma, in the county of Kewaunee and State of Wisconsin, have invented a new and useful Beet Puller, Topper, and Loader; and we do hereby declare the following to be a full, clear, and exact description of the invention, such as will enable others skilled in the art to which it appertains to make and use the same.

This invention relates to a new and useful improved beet puller, topper and loader.

An object of the invention is the provision of a digger member designed to travel below the surface of the soil and provided with gradually rearwardly inclined members having traveling chains with beet forks, which members are so constructed that the forks of one chain will come closer to the forks of the opposite chain and intermesh, thereby grabbing or forking the beets, and owing to the inclined members, the beets will be gradually extracted or pulled from the soil.

Another feature of the invention is the provision of a series of forks carried by traveling chains, for pushing the beets farther rearwardly, and then additional elevating chains for elevating the beets toward and to a roller having cutting knives, whereby the beets may be topped, the tops being deposited in a hopper, from which they are elevated into a wagon, then placed in a silo, whereas the beets fall into a hopper, from which they are elevated to a beet wagon, and after which delivered to beet cars.

The details of construction may necessitate alterations, falling within the scope of what is claimed.

The invention comprises further features and combination of parts, as hereinafter set forth, shown in the drawings and claimed.

Figure 2:
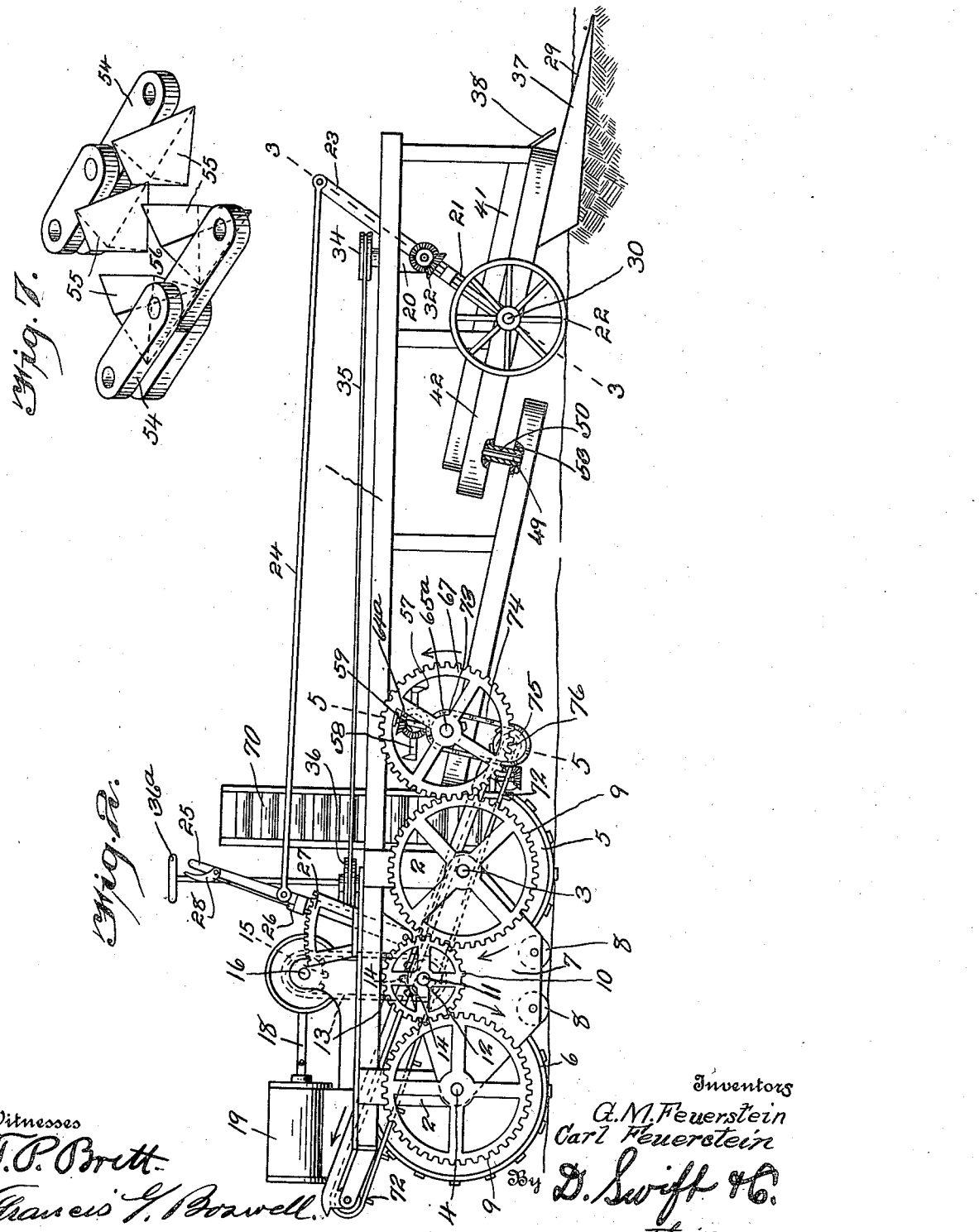
Figure 3:
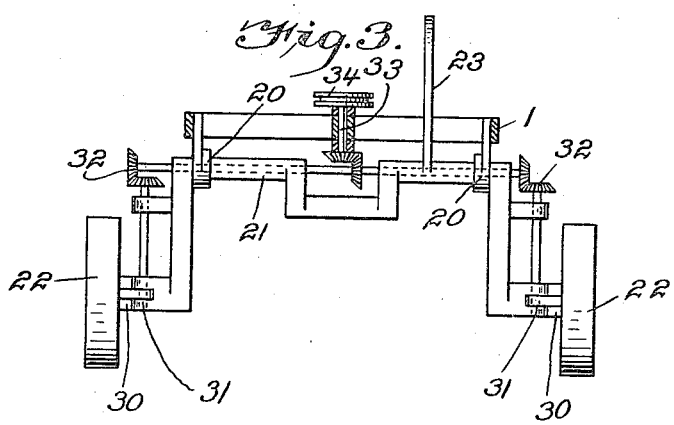
Figure 5:
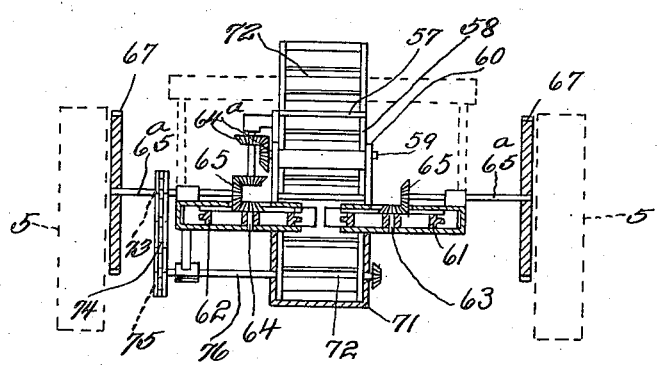
Figure 6:
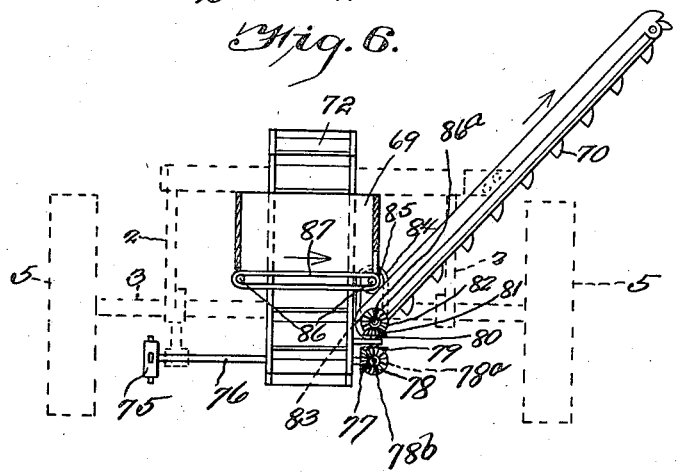

In the drawings:—Figure 1 is a plan view of the improved machine. Fig. 2 is a view in side elevation. Fig. 3 is a sectional view on line 3—3 of Fig. 2. Fig. 4 is an enlarged detail view of the chains including the forks gripping the tops of the beets to carry them to the elevating conveyer, showing the guide members for causing the two chains to move toward one another and intermesh so as to grip the beet tops. Fig. 5 is a sectional view on line 5—5 of Fig. 2. Fig. 6 is a view substantially on line 6—6 of Fig. 1, showing parts in dotted lines and illustrating the hopper 69 and conveyers or elevators 70 and 72. Fig. 7 is a detail view of the chains 54 showing the teeth 55.

Referring more especially to the drawings, 1 designates the frame, the rear end of which is provided with bearings 2, for the axles or shafts 3 and 4, on which the traction wheels 5 and 6 are journaled. These axles 3 and 4 are also mounted in side members 7.

The lower portions of the side members 7 have small wheels or casters 8.

The traction wheels 5 and 6 are provided with flanges having gear teeth 9, which mesh with the gears 10, which are mounted upon and rotatable with the shaft 11, which is mounted in bearings 12 of the side members 7. This shaft 11 has a sprocket chain connection 13 including the sprocket wheels 14 and 15, with the drive shaft 16. This shaft 16 is mounted in suitable bearings of the engine casing and has a crank 17.

The sprocket wheel 15 is carried by the shaft 16.

The crank 17 has a pitman 18 connected to it, which pitman 18 is in turn connected to the plunger (not shown) of the conventional form of high power gasolene engine, denoted by the numeral 19, and indicated on the rear of the frame.

The forward end of the frame is provided with bearings 20, in which an arched rocking shaft or axle 21 is mounted, which is provided with forward supporting traction wheels 22. The shaft 21 has an arm 23 to which a rod 24 is connected. The rear end of the rod 24 is connected to a lever 25, having a dog 26, which coöperates with the teeth of a rack 27, there being a hand grip 28 connected to the dog as shown, for operating the dog, whereby the lever may be held in adjusted positions.

It will be observed that when the lever is moved in one direction or the other, the forward wheels including the shaft or axle 21, will be so manipulated as to cause the forward end of the frame to rise or lower, thereby regulating the depth of the digger member 29. Said shaft or axle 21 includes stub axles 30, on which the wheels 22 rotate. These stub axles are pivoted to the main shaft or axle 21, as shown at 31, in a manner similar to the stub axles of an automobile. These stub axles have connections as indicated at 32 to the steering wheel rod 33, which is provided with a steering wheel 34. The rods 35 are connected to the steering wheel 34 as shown, and are in turn connected to the second steering wheel 36 at the rear of the frame. By manipulation of the wheel 36, the wheel 34 is correspondingly operated, so as to manipulate the front wheels 22.

The digger members 29 are connected to the frame, as shown, and provided with guides or beet elevators or pullers 37. These elevators or pullers are arranged at angles to each other as shown, as well as being inclined upwardly and rearwardly. As the digger members 29 move through the soil below the surface, the pullers, owing to their construction and arrangement, gradually pull the beets from the soil, sufficiently to permit the fork 38 of the chain to grip the tops of the beets. The forks 38 are carried by the chains 39, which are provided with rollers 40, which operate in the guides 41 of the members 42. These members 42 are so constructed that as the chains travel through the guide substantially their entire length, the forks intermesh, but at the forward ends, as well as the rear ends of said members 42, the forks separate. This is accomplished owing to the tapering portions 44 and 45 of the members 42. In allowing the forks to separate at the forward and read ends, the beets are easily gripped and released automatically.

The guides 41 of the members or housings 42 act to dislodge the beets from between the forks or the gripping members as said members or forks disengage or separate.

The chains 39 travel about the sprockets 46 and 47 of the shafts 48 and 49. Each shaft 49 has a suitable tubular connection as indicated at 50 with each of the sprocket wheels 53, and traveling about each sprocket 53 is a chain 54, which is provided with V-shaped members 55. These V-shaped members are so arranged as to afford V-shaped openings 56, and between the diametrically opposing openings the beets are delivered by said forks 38. As the chains 54 travel in the direction of the arrow $a$, the beets are elevated to and toward the knives 57 of the revoluble frame 58, which is carried by and rotatable with the shaft 59 mounted in suitable bearings of the super-imposed frame 60 of the frame 1. The chains 54 also travel about the rear sprockets 61 and 62 of the shafts 63 and 64, which are geared as indicated at 65 to the shafts $65^a$, so as to cause the chain to move in the direction as indicated by said arrow $a$. Each shaft 63 and 64 is geared with one of the gears 9 of each one of the forward wheels 5, by means of the gear 67. As shown the shaft 64 also has gear connections $64^a$ with the revoluble frame 58. As the beets are elevated toward the rear of the machine, the knives remove the tops of the beets and throw them in a hopper 69, from which they are conveyed by an elevator 70 to a receptacle, from whence they may be removed and deposited in a silo (not shown). As the tops of the beets are severed, the beets drop into a hopper 71, and are then elevated by a conveyer 72 to a beet wagon or the like (not shown).

Upon one end of the shaft 76 is a sprocket 75, over which the chain 74 passes, which chain in turn passes about the sprocket 73, thereby in this manner through the gear 67, the revolving cutter frame or reel is actuated.

On the other end of the shaft 76 a beveled gear 77 is provided, meshing with a beveled gear 78 on a shaft $78^b$, mounted in any suitable bearings of the frame. Upon one end of the shaft $78^b$ is an additional beveled gear $78^a$, meshing with a beveled gear 79 mounted upon a shaft 80, which is mounted in suitable bearings of the frame, as shown clearly in Fig. 6. The stub shaft 80 has an additional gear 81, meshing with a beveled gear 82, on the lower shaft $86^a$ of the conveyer 70. The other end of the shaft $86^a$ has a belt or sprocket connection 84 with the wheel or sprocket 85, of one of the shafts 86 of the conveyer 87. By this mode of gearing it will be seen that power is transmitted to the conveyers 70 and 87. Furthermore, it will be seen that power is transmitted to the conveyer 72, by means of the shaft $65^a$, and by virtue of the gear $64^a$, as shown clearly in Fig. 5.

The invention having been set forth, what is claimed as new and useful is:—

1. In a harvesting machine, a frame having a digger, a pair of operating chains above the digger and having their adjacent portions moving rearwardly and spaced apart to form a throat, said chains having a plurality of beet leaf grippers, each gripper comprising a plurality of teeth adapted to intermesh with the teeth of an opposing gripper of the opposite chain throughout the length of said throat.

2. In a beet harvesting machine having digging means, a pair of chains traveling in horizontal planes, said chains having adjacent portions moving parallel to each other and rearwardly forming a beet throat, the adjacent portions of said chains having a plurality of leaf gripping members extending partially transversely of said throat, each gripping member comprising a narrow neck secured to its attendant chain, and a broad portion extending in a plane corresponding to the plane in which said chain travels, the broad portion of each gripping member having a plurality of teeth extending downwardly in and partially across said throat and designed to intermesh with the teeth of an opposing gripper, said teeth remaining intermeshed throughout the length of their travel through the throat.

3. In a beet harvesting machine having digging means and provided with a topping mechanism, a pair of chains traveling in horizontal planes, said chains having adjacent portions moving parallel to each other and rearwardly forming a beet throat, the adjacent portions of said chains having a plurality of leaf gripping members extending partially transversely of said throat to convey the beets rearwardly and upwardly from the digging means, each gripping member comprising a narrow neck secured to its attendant chain, and a broad portion extending in a plane corresponding to the plane in which said chain travels, the broad portion of each gripping member having a plurality of teeth extending downwardly in and partially across said throat and designed to intermesh with the teeth of an opposing gripper, said teeth remaining intermeshed throughout the length of their travel through the throat, a housing frame for each chain, its inner portion being spaced apart and parallel with the corresponding portion of the opposite housing frame throughout the length of said throat, said housing frame adjacent the rear portion of said chains acting to dislodge the beet from between said gripping members as the members disengage, and beet body grasping means to grasp the beets as they leave the gripping members and convey them to the topping mechanism of the harvester.

4. A beet harvesting machine having digging means at its forward portion and provided with a beet topping mechanism adjacent its rear portion, a pair of housing frames having their adjacent portions spaced apart and parallel forming a beet throat, a pair of conveying devices having adjacent portions spaced apart and parallel for a portion of the length of said throat, said conveying devices having beet leaf gripping members comprising a plurality of intermeshing teeth, and beet body grasping means for catching the beets as they leave the gripping members to convey them to the topping mechanism, said housing frame adjacent where the gripping members release the leaves acting to dislodge the beets from between the gripping members.

5. A beet harvesting machine having digging means at its forward portion and provided with a beet topping mechanism adjacent its rear portion, a pair of housing frames having their adjacent portions spaced apart and parallel forming a beet throat, a pair of conveying devices having adjacent portions spaced apart and parallel for a portion of the length of said throat, said conveying devices having beet leaf gripping members comprising a plurality of intermeshing teeth, and beet body grasping means for catching the beets as they leave the gripping members to convey them to the topping mechanism.

6. In a beet harvesting machine, a pair of conveying devices moving in horizontal plane and having portions moving parallel spaced apart and adjacent each other to carry the beets rearwardly, said conveying devices having a plurality of beet leaf gripping members, the members of one conveying device being spaced apart from each other, each gripping member comprising a narrow shank connected to the conveying device and a broad portion, said broad portion having a plurality of teeth extending downwardly and toward and intermeshing with the teeth of an opposing gripping member of the opposite conveying device.

In testimony whereof we have signed our names to this specification in the presence of two subscribing witnesses.

GEORGE M. FEUERSTEIN.
CARL FEUERSTEIN.

Witnesses:
MARTIN PERLEWITZ,
ROBT. RICHMOND.